US012600089B2

(12) United States Patent
Lecompere et al.

(10) Patent No.: US 12,600,089 B2
(45) Date of Patent: Apr. 14, 2026

(54) MANUFACTURING SYSTEM CONFIGURED TO CARRY OUT A METHOD FOR ADDITIVELY MANUFACTURING AN OPHTHALMIC DEVICE AND SUCH A METHOD

(71) Applicant: ESSILOR INTERNATIONAL, Charenton-le-Pont (FR)

(72) Inventors: Maxime Lecompere, Maisons-Alfort (FR); Pierre Leite, Breuillet (FR); Laurent Huprel, Alfortville (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 73 days.

(21) Appl. No.: 18/718,685

(22) PCT Filed: Dec. 13, 2022

(86) PCT No.: PCT/EP2022/085505
§ 371 (c)(1),
(2) Date: Jun. 11, 2024

(87) PCT Pub. No.: WO2023/110805
PCT Pub. Date: Jun. 22, 2023

(65) Prior Publication Data
US 2025/0042087 A1     Feb. 6, 2025

(30) Foreign Application Priority Data
Dec. 13, 2021     (EP) ..................................... 21306758

(51) Int. Cl.
B29C 64/245        (2017.01)
B29C 64/124        (2017.01)
(Continued)

(52) U.S. Cl.
CPC .......... B29C 64/245 (2017.08); B29C 64/124 (2017.08); B33Y 10/00 (2014.12);
(Continued)

(58) Field of Classification Search
CPC ... B29C 64/124; B29C 64/129; B29C 64/135; B29C 64/264; B29C 64/268;
(Continued)

(56) References Cited

U.S. PATENT DOCUMENTS 7,195,472 B2      3/2007   John
2020/0139630 A1 *  5/2020  Prucha ................. B01D 63/081
2021/0122105 A1 *  4/2021  Van Esbroeck ........ B33Y 10/00

FOREIGN PATENT DOCUMENTS

DE      102012011610 A1 * 11/2012  .......... B29C 64/129
WO         2018170544 A1   9/2018

OTHER PUBLICATIONS

International Search Report for PCT/EP2022/085505 mailed Jan. 26, 2023, 3 pages.
(Continued)

*Primary Examiner* — JaMel M Nelson
(74) *Attorney, Agent, or Firm* — Nixon & Vanderhye

(57)        ABSTRACT
The disclosure provides an additive manufacturing system comprising a tank (10) filled with a volume of a predetermined material (11), a building platform (20) on which layers (3) made from the predetermined material are formed, a curing device (12) configured for at least partially hardening the layers of the ophthalmic device, a transparent plate (21) located between the building platform (20) and the curing device (13), and a flexible separation film (22) mechanically connected by ends (31) to a frame (30) and at least partially located between the transparent plate (21) and the building platform (20), the additive manufacturing system (1) being configured so that the transparent plate, the
(Continued)

flexible separation film and the building platform are movable one relative to the other and admit first relative positions corresponding to building positions of a layer, in which the transparent plate is applied against the flexible separation film which is in a tense state, and second relative positions corresponding to layering positions of a layer, in which the transparent plate is moved relative to the frame and is remote to the flexible separation film which is at least partially in a loose state.

15 Claims, 3 Drawing Sheets

(51) Int. Cl.

| | | |
|---|---|---|
| *B33Y 10/00* | (2015.01) | |
| *B33Y 30/00* | (2015.01) | |
| *B33Y 80/00* | (2015.01) | |
| *B29L 11/00* | (2006.01) | |

(52) U.S. Cl.
CPC ............... *B33Y 30/00* (2014.12); *B33Y 80/00* (2014.12); *B29L 2011/00* (2013.01)

(58) Field of Classification Search
CPC ... B29C 64/273; B29C 64/277; B29C 64/282; B29C 64/286; B29C 64/291; B29C 64/393; B33Y 10/00; B33Y 30/00; B33Y 50/02
See application file for complete search history.

(56) References Cited

OTHER PUBLICATIONS

Written Opinion of ISA for PCT/EP2022/085505 mailed Jan. 26, 2023, 7 pages.

* cited by examiner

MANUFACTURING SYSTEM CONFIGURED TO CARRY OUT A METHOD FOR ADDITIVELY MANUFACTURING AN OPHTHALMIC DEVICE AND SUCH A METHOD

CROSS-REFERENCE TO RELATED APPLICATIONS

This application is the U.S. national phase of International Application No. PCT/EP2022/085505 filed Dec. 13, 2022 which designated the U.S. and claims priority to EP 21306758.0 filed Dec. 13, 2021, the entire contents of each of which are hereby incorporated by reference.

FIELD OF THE DISCLOSURE

The disclosure relates to a manufacturing system configured to carry out a method for additively manufacturing an ophthalmic device and such a method for additively manufacturing such an ophthalmic device.

BACKGROUND ART

American U.S. Pat. No. 7,195,472 relates to a method for additively manufacturing an object, which allows easy separation of a hardened layer from a transparent reference plane formed by a so-called contact window, so that the layer currently being hardened in conjunction with the layer structure already produced is preserved in its original form, the necessary path of movement for separation being minimised and so the building time for each layer being reduced. For instance, a separating layer in the form of a transparent film is arranged between material and a transparent plate, or contact window, in such a way that the separating layer undergoes no bonding to the transparent plate. The separating layer, or transparent film, does not adhere to the transparent plate and is deformed elastically during the separation process causing peeling of the film from the hardened layer. If the transparent film is of high-elasticity material, a shearing effect can be of help during the separation process. U.S. Pat. No. 7,195,472 therefore teaches that the combination of peeling and shearing effects facilitates the separation and limits the path of separation.

International patent application WO 2018/170544 discloses an apparatus for making an object using a stereolithographic method. The apparatus comprises a positioner which is configured for moving a platform on which the object is made and, alternatively or additionally, the positioner may be arranged to move a flexible element and a surface towards the platform.

SUMMARY OF THE DISCLOSURE

The disclosure is directed to a manufacturing system configured to carry out a method for additively manufacturing an ophthalmic device, and to the method for additively manufacturing such an ophthalmic device including curing and layering steps thanks to a transparent plate and a flexible separation film.

The disclosure accordingly provides an additive manufacturing system for additively manufacturing an ophthalmic device layer by layer, comprising a tank filled with a volume of a predetermined material, a building platform on which layers made from the predetermined material are formed, a curing device configured for at least partially hardening the layers of the ophthalmic device to be manufactured, a transparent plate located between the building platform and the curing device, and a flexible separation film mechanically connected by ends to a frame and at least partially located between the transparent plate and the building platform, the additive manufacturing system being configured so that the transparent plate, the flexible separation film and the building platform are movable one relative to the other and admit first relative positions corresponding to building positions of a layer, in which the transparent plate is applied against the flexible separation film which is in a tense state, and second relative positions corresponding to layering positions of a layer, in which the transparent plate is moved relative to the frame and is remote to the flexible separation film which is at least partially in a loose state.

In the manufacturing system according to the disclosure, thanks to the relative movement between the transparent plate, the flexible separation film and the building platform, these parts can be made either in first relative positions corresponding to building positions of a layer, in which the transparent plate is applied against the flexible separation film which is in a tense state, or in second relative positions corresponding to layering positions of a layer, in which the transparent plate is moved relative to the frame and is remote to the flexible separation film.

When the transparent plate, the flexible separation film and the building platform are in building positions, the layer is cured thanks to the curing device.

When the transparent plate, the flexible separation film and the building platform are in layering positions, the flexible separation film is detached from the layer previously cured.

In this respect, at least the transparent plate and the flexible separation film are moved remote to each other.

Before peeling, the flexible separation film is at least partially loose.

During peeling, the flexible separation film is tensed, but not stretched. When the flexible separation film is detached from the layer previously cured, the flexible separation film is fully loose.

The force applied to the flexible separation film is in relation to the tearing effect between the flexible film and the polymerised predetermined material.

In other words, thanks to the manufacturing system according to the disclosure, the flexible separation film may have a state in which it is fully loose, at least partially loose and at least partially tensed, and fully tensed.

The flexible separation film is never or almost never in a stretch state. At worst, the flexible separation film could be stretched for a very short time, for instance no more than few seconds, and the flexible separation film could be very shortly elongated, for instance in a range lower than 1%.

Thus, in the present disclosure, the flexible separation film is tensed when it is very shortly elongated according the Hooke's law. The forces are thus regularly distributed along the flexible separation film.

The flexible separation film can also be stretched when it is also very shortly elongated preferably in the elastically zone. If any, the forces are rather localized on the flexible separation film.

To be noted that the loose state of the flexible separation film allows reducing the solicitations of the flexible separation film during the manufacturing of the ophthalmic device such that the flexible separation film has a longer lifespan and/or keeps its usual properties.

For instance, thanks to the manufacturing system according to the disclosure, there is no need to inflate and deflate, successively and with a dedicated fluid, the flexible separation film. The flexible separation film is thus less solicited.

Advantageous and convenient features of the manufacturing system are described below.

The additive manufacturing system comprises a moving unit configured to move one relative to the others at least two of the building platform, the transparent plate and the frame to which is mechanically connected by ends of the flexible separation film.

The moving unit acts on the building platform, and/or on the transparent plate, and/or on the frame bearing partially the flexible separation film, dependently or independently.

The moving unit is configured: to raise up or down the building platform towards or remote to a bottom of the tank; and/or raise up or down the transparent plate towards or remote to the bottom of the tank and thus towards or remote to the building platform; and/or raise up or down the frame to which the flexible separation film is mechanically connected, towards or remote to the bottom of the tank in order to locate at least a part of the flexible separation film in a position relative to both building platform and transparent plate; and/or to raise up or down the tank relative to at least one of the building platform, transparent plate and frame to which the flexible separation film is mechanically connected.

In building positions, the transparent plate is located close to the building platform and acts on a middle portion of the flexible separation film so that the middle portion of the flexible separation film is tensed, but not stretched, and a predetermined thickness of the predetermined material remains between the middle portion of the flexible separation film and an uppermost layer on the building platform.

The flexible separation film comprises other portions which are interposed between the middle portion and the ends of flexible separation film, which are remote to the layer and located between the frame to which the flexible separation film is mechanically connected by the ends and an outline of the layer.

The other portions of the flexible separation films are at least partially tensed thanks to the action of the transparent plate which is located at a distance of the frame.

The other portions of the flexible separation film may have a substantially L-shaped, having a first arm extending from the portion and along the transparent plate and a second arm extending from the first arm to the frame.

To be noted that the L-shape of the other portions of the flexible separation film does not mean that the first arm and the second arm are necessarily at a right angle one to each other. For instance, the first arm and the second arm are inclined one to each other by an angle comprised between around 90° and about 135°.

In at least layering positions, the transparent plate is moved remote to the building platform and the flexible separation film and is located close to the frame to which the flexible separation film is mechanically connected by the ends, and a temporarily space is formed between the transparent plate and the flexible separation film.

The flexible separation film comprises a middle portion and other portions extending from the middle portion to the ends of the flexible separation film, the middle portion being at least partially tensed due to an adhesive contact with a cured uppermost layer, and the other portions being loose, so that the other portions are at least partially free of movement between the tensed portion and the respective ends.

In at least other layering positions, the flexible separation film is fully peeled away from and located remote to a cured uppermost layer on the building platform, and is fully loose and free of movement between the ends.

The disclosure further provides a method for additively manufacturing an ophthalmic device layer by layer, the manufacturing method comprising the steps of:

providing a manufacturing system having a tank filled with a volume of a predetermined material, a building platform on which layers made from the predetermined material are formed, a curing device configured for at least partially hardening the layers of the ophthalmic device to be manufactured, a transparent plate located between the building platform and the curing device, and a flexible separation film mechanically connected by ends to a frame and at least partially located between the transparent plate and the building platform;

controlling the additive manufacturing system so that the transparent plate, the flexible separation film and the building platform are moved one relative to the other and admit first relative positions corresponding to building positions of a layer, in which the transparent plate is applied against the flexible separation film which is in a tense state; and controlling the additive manufacturing system so that transparent plate, the flexible separation film and the building platform are moved one relative to the other and admit a second relative positions corresponding to layering positions of a layer, in which the transparent plate is moved relative to the frame and is remote to the flexible separation film which is at least partially in a loose state.

Advantageous and convenient features of the manufacturing system are described below.

The method comprises the steps of moving one relative to the others at least two of the building platform, the transparent plate and the frame to which is mechanically connected by ends of the flexible separation film, dependently or independently; and in particular: raising up or down the building platform towards or remote to a bottom of the tank; and/or raising up or down the transparent plate towards or remote to the bottom of the tank and thus towards or remote to the building platform; and/or raising up or down the frame to which the flexible separation film is mechanically connected, towards or remote to the bottom of the tank in order to locate at least a part of the flexible separation film in a position relative to both building platform and transparent plate; and/or to raising up or down the tank relative to at least one of the building platform, transparent plate and frame to which the flexible separation film is mechanically connected.

In building positions, the transparent plate is located close to the building platform and acts on a middle portion of the flexible separation film so that the middle portion of the flexible separation film is tensed, but not stretched, and a predetermined thickness of the predetermined material remains between the middle portion of the flexible separation film and an uppermost layer on the building platform, and/or the flexible separation film comprises other portions which are interposed between the middle portion and the ends of flexible separation film, which are remote to the layer and located between the frame to which the flexible separation film is mechanically connected by the ends and an outline of the layer, and/or the other portions of the flexible separation films are at least partially tensed thanks to the action of the transparent plate which is located at a distance of the frame.

In at least layering positions, the transparent plate is moved remote to the building platform and the flexible separation film and is located close to the frame to which the flexible separation film is mechanically connected by the ends, and a temporarily space is formed between the transparent plate and the flexible separation film, and/or the flexible separation film comprises a middle portion and other portions extending from the middle portion to the ends of the flexible separation film, the middle portion being tensed due to an adhesive contact with a cured uppermost layer, and the other portions being loose, so that the other portions are at least partially free of movement between the tensed portion and the respective ends; and/or in at least other layering positions, the flexible separation film is fully peeled away from and located remote to a cured uppermost layer on the building platform, and is fully loose and free of movement between the ends.

BRIEF DESCRIPTION OF THE DRAWINGS

The description of the disclosure now continues with a detailed description of advantageous embodiments given hereinafter by way of non-limiting example and with reference to the appended drawings.

DETAILED DESCRIPTION OF EXAMPLE EMBODIMENTS

Figure 1:
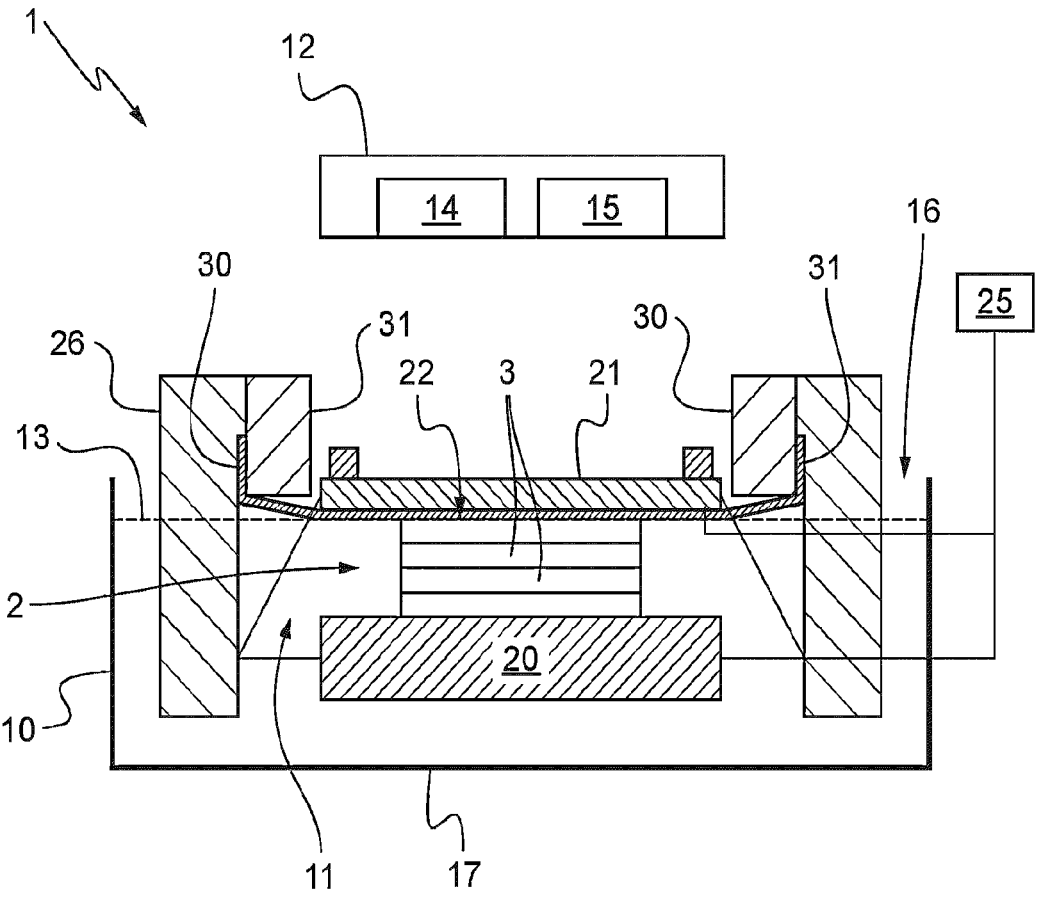
FIG. 1 is a schematic view of a manufacturing system configured to carry out a method for additively manufacturing ophthalmic devices.

FIG. 1 illustrates schematically a manufacturing system 1 configured to carry out a method for additively manufacturing ophthalmic devices 2.

The manufacturing system 1 comprises a tank 10 filled with a volume of a predetermined material 11 suitable for manufacturing ophthalmic devices 2, such as a liquid resin for making eyeglasses.

The manufacturing system 1 is an additive system configured for manufacturing the ophthalmic devices 2 layer by layer, each layer 3 being formed by a volume of the predetermined material 11 at least partially polymerized and hardened.

In this respect, the manufacturing system 1 comprises an unit 12 configured for projecting and polymerizing at least one image on a surface 13 of the volume of the predetermined material 11 in the tank 10, also called additive unit.

The additive unit 12 may comprise a processing apparatus 14 having for instance a digital lighting processor which is configured for processing a single image, or pattern, and/or a plurality of images, or patterns.

The additive unit 12 may further comprise a projecting and polymerizing apparatus 15 configured for providing a curing energy, and having for instance a projector and a radiation source, or energy source, or other well-known sources for projecting the single image in a single direction toward the material 11 for each layer 3, and/or a plurality of images projected simultaneously of successively, and then polymerizing and hardening the material 11.

In variant, the digital lighting processor and polymerizing apparatus are replaced by a laser source and a scanning device which are configured for scanning with the laser source the surface 13 of the material 11.

In FIG. 1, the additive unit 12 is located on an upper side of the tank 10, and faces an upper opening 16 of the tank 10 which is opposite to a bottom 17 of the tank 10. Such arrangement allows carrying out a so-called top-down process, as explained below.

In another arrangement, the additive unit can be located on a lower side of the tank, and faces a supplemental opening formed on the bottom of the tank. Such another arrangement allows carrying out a so-called bottom-up process, as also explained below.

The manufacturing system 1 further comprises a building platform 20 at least partially immersed in the tank 10, a transparent plate 21 and a flexible separation film 22 represented in FIG. 1 as being laid on the transparent plate 21 and being in contact therewith.

The flexible separation film 22 faces the building platform 20 and the transparent plate 21 faces the additive unit 12.

The flexible separation film 22 is mechanically connected by ends 31 to a frame 30 of the manufacturing system 1.

The transparent plate can be made from glass or plastic, while the flexible separation film can be made for instance from polytetrafluoroethylene (PTFE). In variants, the flexible separation film can be made for instance from Teflon AF such as for instance AF 2400 or AF 1600, or perfluoroelastomers (PFE), polypropylene (PP), polyethylene terephthalate (PET), perfluoroalkoxy (PFA), or also from silicone, etc.

The additive unit 12 is thus configured for projecting at least one image, or pattern, on the surface 13 of the volume of the predetermined material 11 in the tank 10 for forming each layer 3 of the ophthalmic device 2 on the building platform 20, through the transparent plate 21 and flexible separation film 22, so that each layer 3 which is formed and at least partially hardened is sandwiched between the building platform 20 and the flexible separation film 22.

In particular, the additive unit 12 is able to transfer to the surface of the volume of the predetermined material, in an image or a pattern, a quantity of energy suitable to trigger polymerization of the predetermined material.

The manufacturing system 1 further comprises a moving unit 25 configured to move at least one of the building platform 20, the transparent plate 21 and the frame 30 one relative to the others.

The building platform 20, the transparent plate 21 and the flexible separation film 22 are each mounted, directly or indirectly, on a rigid body 26, and can also be mounted movable relative to the rigid body 26.

The moving unit 25 may act on the building platform 20, or on the transparent plate 21, or on the frame 30 bearing partially the flexible separation film 22, or on both of them. The moving unit 25 may act on the building platform 20, the transparent plate 21 and the flexible separation film 22 dependently or independently.

In particular, and as better explained below, the moving unit 25 may be configured to:

raise up or down the building platform 20 towards or remote to a bottom 17 of the tank 10; and/or raise up or down the transparent plate 21 towards or remote to the bottom 17 of the tank 10 and thus towards or remote to the building platform 20; and/or raise up or down the frame 36 to which the flexible separation film 22 is mechanically connected, towards or remote to the bottom 17 of the tank 10 in order to locate at least a part of the flexible separation film 22 in a position relative to both building platform 20 and transparent plate 21.

In an alternative embodiment, the moving unit 25 may be configured to raise up or down the tank 10 relative to at least one of the building platform 20, transparent plate 21 and frame 30 to which the flexible separation film 22 is mechanically connected.

Figure 2:
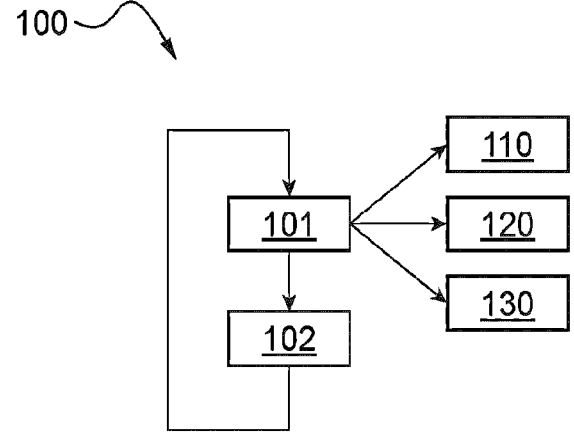
FIG. 2 is a block diagram showing steps of the method for additively manufacturing an ophthalmic device according to the disclosure.

FIG. 2 is a block diagram showing the main steps of the method for additively manufacturing ophthalmic devices 2 carried out thanks to the manufacturing system 1 as described above.

The method comprises successive steps 100 of additively manufacturing the plurality of layers 3 of the predetermined material 11, layer by layer.

The main steps of the method comprises iteratively steps of layering 101 and steps of curing 102 in order to from, layer by layer, the ophthalmic devices 2.

The steps of layering 101 are carried out for locating the parts of the manufacturing system, including at least the building platform 20, the transparent plate 21 and the flexible separation film 22, in a building position in which only a predetermined thickness of the predetermined material 11 is provided between the flexible separation film 22 and the building platform 20 or a layer already formed thereon. The predetermined thickness of the predetermined material 11 corresponds to the thickness of the layer, when cured, to be formed.

The steps of layering 101 may comprise the step 110 of moving the building platform 20 in a predetermined position, and/or the step 120 of moving the frame 30 to which the flexible separation film 22 is mechanically fastened, relative to the building platform 20, and/or the step 130 of moving the transparent plate 21 relative to the building platform 20 and/or relative to the frame 30 to which flexible separation film 22 is mechanically fastened.

The curing steps 102 comprise the steps of projecting and polymerizing at least one image on the surface 13 of the volume of the predetermined material 11 in the tank 10, through the transparent plate 21 and the flexible separation film 22 laying on the transparent plate 21 and being in contact therewith.

The curing steps 102 encompass the projection of a single image in a single direction toward the material 11, for instance thanks to the projecting apparatus 14, or the projection of a plurality of images projected simultaneously of successively. Such a process is usually called DLP process.

In variant, the step of projecting an image encompasses the scanning by a laser source of the surface of the material. Such a process is usually called SLA process.

Each layer 3 of the ophthalmic device 2 is formed, or layered, and at least partially hardened by curing, on the building platform 20 or on a previous layer on this platform, in a location wherein the layer 3 is sandwiched between the building platform 20 or the previous layer and the flexible separation film 22.

When the layer 3 is cured, the flexible separation film 22 is in contact with the hardened or partially hardened layer 3 so that the flexible separation film 22 at least partially adheres to the hardened or partially hardened layer 3.

Therefore, following the curing step, when a further layering step is carried, there is a need to peel the flexible separation film 22 from the hardened or partially hardened layer 3 without damaging the latter.

FIGS. 3 to 10 show in detail certain steps of the method shown on Figure and carried out by the manufacturing system visible on FIG. 1.

Figure 3:
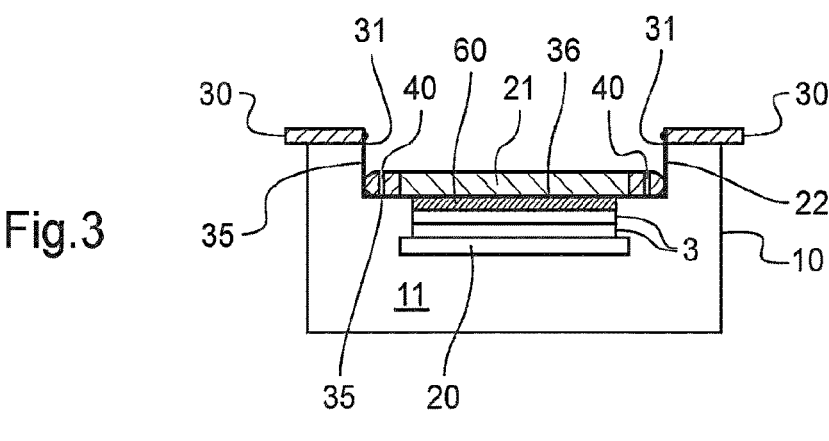
FIGS. 3 to 10 illustrate detail of certain steps of the method shown on FIG. 2 and carried out by the manufacturing system visible on FIG. 1.
Figure 5:
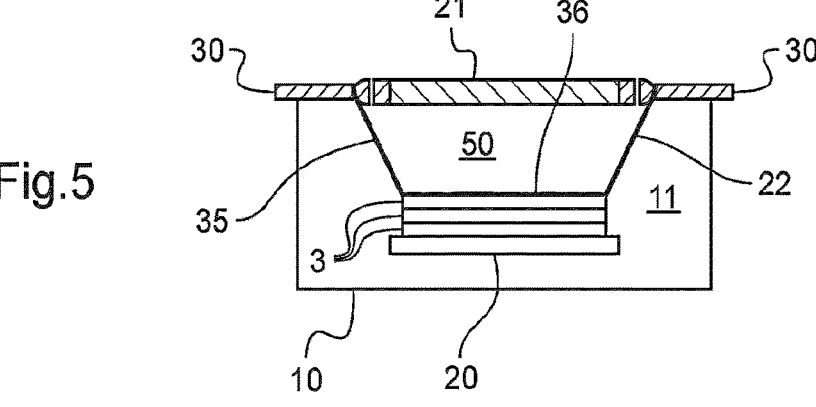
Figure 6:
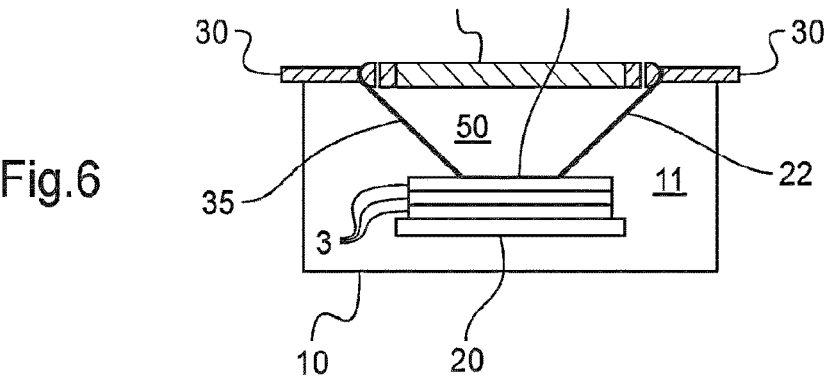
Figures 7, 8, 9, 10:
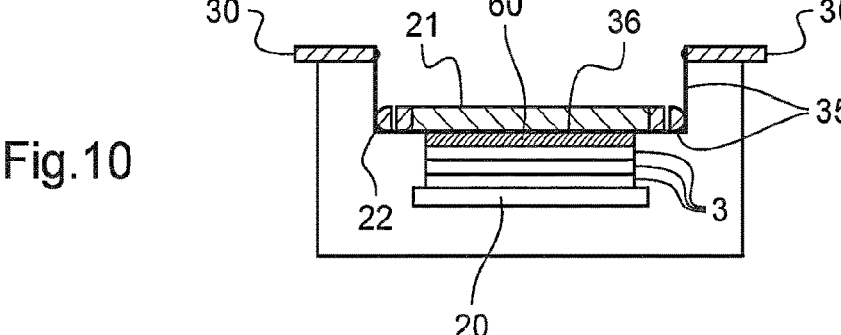

In particular, the curing step 101 illustrated in FIG. 3 is followed by the layering step 102 in FIGS. 4 to 10, which FIG. 10 can be equated also to a further curing step 101.

In FIG. 3, the building platform 20 is immersed in the predetermined material 11 at a building position in the tank 10.

A plurality of layers 3 at least partially hardened are already formed on the building platform 20.

The transparent plate 21 is here located close to the building platform 20 and acts on a portion 36 of the flexible separation film 22 so that the portion 36 of the flexible separation film 22 is tensed, but not stretched, and a predetermined thickness 60 of the predetermined material 11 remains between the portion 36 of the flexible separation film 22 and the uppermost layer 3 on the building platform 20.

Figure 4:
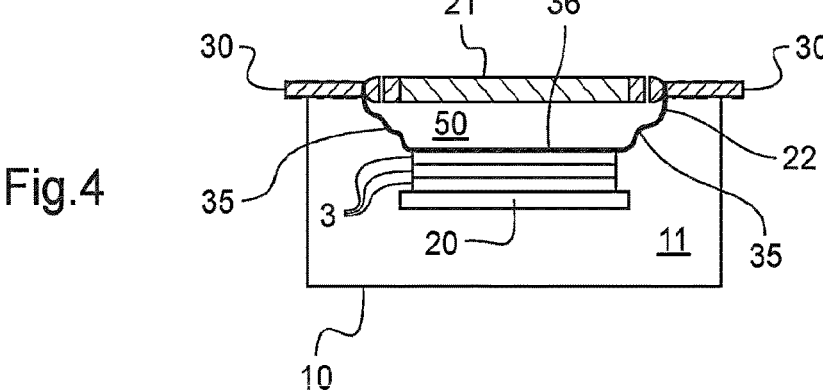

In this configuration of the manufacturing system, which can be equated to a curing configuration, the curing device (not represented on FIG. 3) can operate for at least partially hardening the volume of predetermined material 11 in the predetermined thickness 60 between the portion 36 of the flexible separation film 22 and the uppermost layer 3 on the building platform 20 in order to form a novel uppermost layer 3 (visible in FIG. 4).

In FIG. 3, the building platform 20, the transparent plate 21 and the flexible separation film 22 are in first relative positions corresponding to building positions of a layer 3.

The transparent plate 21 is here wider than the building platform 20 and the layer 3 to be formed so that portions 35 of the flexible separation film 22, interposed between the tensed portion 36 and the ends 31 of flexible separation film 22, are not in contact with the layers 3.

The portions 35 of the flexible separation film 22 are here located between the frame 30 to which the flexible separation film 22 is mechanically connected by the ends 31 and an outline of the layers 3.

The portions 35 of the flexible separation film 22 are at least partially tensed thanks to the action of the transparent plate 21 which is here located at a distance, said building distance, of the frame 30.

In the curing configuration of the manufacturing system, the portions 35 of the flexible separation film 22 may have an L-shaped, having a first arm extending from the portion 36 and along the transparent plate 21 and a second arm extending from the first arm to the frame 30.

To be noted that the transparent plate 21 comprises vents 40 which are here formed at the location of the portions 35 of the flexible separation film 22.

In an alternative embodiment, the transparent plate 21 can be devoid of such vent because of no-sealing contact between the flexible separation film 22 and the transparent plate 21.

In FIG. 4, the transparent plate 21 has been moved remote to the building platform 20 and the flexible separation film 22.

The transparent plate 21 has been raised up and is located close to the frame 30 to which the flexible separation film 22 is mechanically connected by the ends 31.

The transparent plate 21 is thus no longer in contact with the flexible separation film 22 and a temporarily space 50 is formed there-between.

The temporarily space 50 can be filled of a fluid, such as for instance air, thanks to the vents 40.

The portion 36 of the flexible separation film 22 remains tensed due to the adhesive contact with the cured uppermost layer 3, while the portions 35 of the flexible separation film 22 are loose, or in a loose state.

Said otherwise, the portions 35 are at least partially free of movement between the tensed portion 36 and the respective ends 31.

In FIG. 5, the building platform 20 has been moved remote to the transparent 21.

The building platform 20 has been raised down towards the bottom of the tank 10 and remotely from the frame 30 to which the flexible separation film 22 is mechanically connected by the ends 31.

The temporarily space 50 defined between the transparent plate 21 and the flexible separation film 22 has been expanded.

The portion 36 of the flexible separation film 22 remains tensed due to the adhesive contact with the cured uppermost layer 3 yet, while the portions 35 of the flexible separation film 22 are no longer loose.

The portions 35 are now tensed, not stretched, between the tensed portion 36 and the respective ends 31.

In FIG. 6, the building platform 20 has been further moved remote to the transparent 21 and raised down towards the bottom of the tank 10, remotely from the frame 30 to which the flexible separation film 22 is mechanically connected by the ends 31.

The temporarily space 50 defined between the transparent plate 21 and the flexible separation film 22 has been further expanded.

The flexible separation film 22 begins to peel away from the cured uppermost layer 3.

The portion 36 which is tensed and in contact with the cured uppermost layer 3 decreases, while the portions 35 extending between the portion 36 and the ends 31 increases and are tensed.

In FIG. 7, the building platform 20 has been further moved remote to the transparent 21 and raised down towards the bottom of the tank 10, remotely from the frame 30 to which the flexible separation film 22 is mechanically connected by the ends 31.

The temporarily space 50 defined between the transparent plate 21 and the flexible separation film 22 has been further expanded.

The flexible separation film 22 continues to peel away from the cured uppermost layer 3.

The portion 36 which is tensed and in contact with the cured uppermost layer 3 rather disappeared, while the portions 35 extending between the portion 36 and the ends 31 further increases and are tensed.

In FIG. 8, the flexible separation film 22 is fully peeled away from the cured uppermost layer 3.

The flexible separation film 22 has no longer portion 36 which is tensed and in contact with the cured uppermost layer 3.

The portions 35 thus form a single portion extending between the ends 31, and which is fully loose and free of movement. This single portion 35 is located remote to the uppermost layer 3 on the building platform 20.

It is to be noted that between FIGS. 4 and 8, the transparent plate and next the building platform have been moved. In variant, they can be successively and iteratively moved, the building platform can be moved before transparent plate, or the frame, directly or indirectly via the tank, can be additionally or alternatively moved rather than the building platform.

In FIG. 9, both transparent plate 21 and building platform 20 are moved towards each other and relative to the frame 30.

The transparent plate 21 is thus raised down towards the building platform 20 and the latter is thus raised up towards the transparent plate 21, opposite to the bottom of the tank 10.

The building platform 20 is moved until it reaches a building position in the tank 10, which can be the same or different for the building position shown in FIG. 3.

The transparent plate 21 has an abutting face 70 which pushes, directly and/or with the aid of the fluid in the temporarily space 50 which decreases, and tenses progressively the flexible separation film 22 until a part of the latter, equated to the portion 36 as defined below, is located in front of the uppermost layer 3, with a predetermined thickness 60 of the predetermined material 11 which remains between the portion 36 of the flexible separation film 22 and the uppermost layer 3 on the building platform 20, and the portions 35 are progressively tensed and extend between the portion 36 and the frame 30.

In FIGS. 4 to 9, the building platform 20, the transparent plate 21 and the flexible separation film 22 are in second relative positions corresponding to layering positions for a novel layer 3.

In FIG. 10, like in FIG. 3, the transparent plate 21 is located close to the building platform 20 and acts on the portion 36 of the flexible separation film 22 so that the portion 36 of the flexible separation film 22 is tensed, or in a tense state, but not stretched, and the predetermined thickness 60 of the predetermined material 11 remains between the portion 36 of the flexible separation film 22 and the uppermost layer 3 on the building platform 20.

In this curing configuration, the curing device (not represented on FIG. 10) can operate for at least partially hardening the volume of predetermined material 11 in the predetermined thickness 60 between the portion 36 of the flexible separation film 22 and the uppermost layer 3 on the building platform 20 in order to form another novel uppermost layer 3.

In other words, FIGS. 3 to 10 illustrate the passage of the manufacturing system from the curing configuration of a layer, to a layering configuration and then to the curing configuration of a successive layer.

According to the above description of the manufacturing system and method, the flexible separation film 22 may have a state in which it is fully loose, at least partially loose and at least partially tensed, and fully tensed. However, the flexible separation film 22 is never stretched.

In addition, the manufacturing system 1 requires leaving a sufficient space between the transparent plate 21 and the building platform 20 in order to allow the flexible separation film 22 to be loose.

In this respect, it is described above that the portions 35 of the flexible separation film 22 may have an L-shaped in the curing configuration.

The first arm extending from the portion 36 and along the transparent plate 21 corresponds to a first distance, for instance called horizontal distance, between an edge of the transparent plate 21 and the outline of the uppermost layer 3.

The second arm extending from the first arm to the frame 30 corresponds to a second distance, for instance called vertical distance, between the frame 30 and the edge of the transparent plate 21.

These first arm, second arm and first and second distances are visible on FIG. 3.

In FIGS. 5 to 7, the first distance remains constant while the second distance increases, from a peeling start position of the flexible separation film 22 shown on FIG. 5 to a peeling end position of the flexible separation film 22 shown on FIG. 7.

As shown in FIGS. 5 to 7, the flexible separation film 22 can thus be peeled away from the uppermost layer 3 with a relatively high peeling angle.

Such a relatively high peeling angle may lead to less stress for both the layer 3 and the flexible separation film 22.

Leading less stress is better for both the optical quality of the layer 3 and the lifespan of the flexible separation film 22.

In addition, such a relatively high peeling angle may allow reducing the time of the layering steps, for instance by controlling the speed of the movements of at least one of the building platform 20, transparent plate 21 and flexible separation film 22.

In this respect, it can be noted that when at least a part of the flexible separation film 22 is loose, the velocity of the movement can be higher than when the flexible separation film 22 is tensed.

In other words, from FIG. 3 to FIG. 5, the velocity of the movement of the transparent plate 21 and/or building platform 20 can be relatively high, whereas during the peeling as such, shown on FIGS. 6 to 8, the velocity of the movement of the transparent plate 21 and/or building platform 20 should be decreased compared to FIGS. 3 to 5. In addition, from FIG. 8 to FIG. 10, the velocity of the movement of the transparent plate 21 and/or building platform 20 in order to make the system in the curing configuration by locating the building platform 20 in its building position, approaching the transparent plate 21 and tensing progressively the flexible separation film 22, should be also decreased compared to FIGS. 3 to 5 and can be rather similar, or lower, or higher, compared to the velocity of the movement during peeling and shown on FIGS. 6 to 8.

Other variants which are not illustrated are described below.

The transparent plate may have different shape, including squared, rectangular or others shapes, including a building zone and an edge zone surrounding the building zone.

The transparent plate is transparent to UV light. The transparent plate can be made from glass and/or quartz and/or plastic and/or composite of materials.

The transparent plate can have a hydrophobic treatment.

The building zone may have may have a length equal to around 80 mm or higher than 80 mm, and a width equal to around 75 mm, and the edge zone may have, on each longitudinal side of the building zone, a width equal to around 10 mm or lower than 10 mm and, on each transversal side of the building zone, a length equal or higher than the width on each longitudinal side of the building zone, especially if vents are formed on the transparent plate.

The manufacturing system may further comprises a fluid supply unit configured to supply and suck a fluid between the flexible separation film and the transparent plate.

It should be noted more generally that the disclosure is not limited to the examples described and represented.

The invention claimed is:

1. An additive manufacturing system for additively manufacturing an ophthalmic device layer by layer, comprising a tank (10) filled with a volume of a predetermined material (11), a building platform (20) on which layers (3) made from the predetermined material are formed, a curing device (12) configured for at least partially hardening the layers of the ophthalmic device to be manufactured, a transparent plate (21) located between the building platform (20) and the curing device (13), and a flexible separation film (22) mechanically connected by ends (31) to a frame (30) and at least partially located between the transparent plate (21) and the building platform (20), the additive manufacturing system (1) being configured so that the transparent plate, the flexible separation film and the building platform are movable one relative to the other and admit first relative positions corresponding to building positions of a layer, in which the transparent plate is applied against the flexible separation film which is in a tense state, and second relative positions corresponding to layering positions of a layer, in which the transparent plate is moved relative to the frame and is remote to the flexible separation film which is at least partially in a loose state, wherein the transparent plate, the frame, and the building platform are movable relative to one another and to the tank between the respective first relative position and the respective second relative position.

2. Additive manufacturing system according to claim 1, wherein it comprises a moving unit (25) configured to move one relative to the others at least two of the building platform (20), the transparent plate (21) and the frame (30) to which is mechanically connected by ends (31) of the flexible separation film (22).

3. Additive manufacturing system according to claim 2, wherein the moving unit (25) acts on the building platform (20), and/or on the transparent plate (21), and/or on the frame (30) bearing partially the flexible separation film (22), dependently or independently.

4. Additive manufacturing system according to claim 3, wherein the moving unit (25) is configured: to raise up or down the building platform (20) towards or remote to a bottom (17) of the tank (10); and/or raise up or down the transparent plate (21) towards or remote to the bottom (17) of the tank (10) and thus towards or remote to the building platform (20); and/or raise up or down the frame (30) to which the flexible separation film (22) is mechanically connected, towards or remote to the bottom (17) of the tank (10) in order to locate at least a part of the flexible separation film (22) in a position relative to both building platform (20) and transparent plate (21); and/or to raise up or down the tank (10) relative to at least one of the building platform (20), transparent plate (21) and frame (30) to which the flexible separation film (22) is mechanically connected.

5. Additive manufacturing system according to claim 1, wherein, in building positions, the transparent plate (21) is located close to the building platform (20) and acts on a middle portion (36) of the flexible separation film (22) so that the middle portion (36) of the flexible separation film (22) is tensed, but not stretched, and a predetermined thickness (60) of the predetermined material (11) remains between the middle portion (36) of the flexible separation film (22) and an uppermost layer (3) on the building platform (20).

6. Additive manufacturing system according to claim 5, wherein the flexible separation film (22) comprises other portions (35) which are interposed between the middle portion (36) and the ends (31) of flexible separation film (22), which are remote to the layer (3) and located between the frame (30) to which the flexible separation film (22) is mechanically connected by the ends (31) and an outline of the layer (3).

7. Additive manufacturing system according to claim 6, wherein the other portions (35) of the flexible separation films (22) are at least partially tensed thanks to the action of the transparent plate (21) which is located at a distance of the frame (30).

8. Additive manufacturing system according to claim 7, wherein the other portions (35) of the flexible separation film (22) have an L-shaped, having a first arm extending from the portion (36) and along the transparent plate (21) and a second arm extending from the first arm to the frame (30).

9. Additive manufacturing system according to claim 1, wherein, in at least layering positions, the transparent plate (21) is moved remote to the building platform (20) and the flexible separation film (22) and is located close to the frame (30) to which the flexible separation film (22) is mechanically connected by the ends (31), and a temporarily space (50) is formed between the transparent plate (21) and the flexible separation film (22).

10. Additive manufacturing system according to claim 9, wherein the flexible separation film (22) comprises a middle portion (36) and other portions (35) extending from the middle portion (36) to the ends (31) of the flexible separation film (22), the middle portion (36) being tensed due to an adhesive contact with a cured uppermost layer (3), and the other portions (35) being loose, so that the other portions (35) are at least partially free of movement between the tensed portion (36) and the respective ends (31).

11. Additive manufacturing system according to claim 1, wherein, in at least other layering positions, the flexible separation film (22) is fully peeled away from and located remote to a cured uppermost layer on the building platform (20), and is fully loose and free of movement between the ends (31).

12. A method for additively manufacturing an ophthalmic device layer by layer, the manufacturing method comprising the steps of:

providing a manufacturing system (1) having a tank (10) filled with a volume of a predetermined material (11), a building platform (20) on which layers (3) made from the predetermined material are formed, a curing device (12) configured for at least partially hardening the layers of the ophthalmic device to be manufactured, a transparent plate (21) located between the building platform (20) and the curing device (13), and a flexible separation film (22) mechanically connected by ends (31) to a frame (30) and at least partially located between the transparent plate (21) and the building platform (20);

controlling the additive manufacturing system (1) so that the transparent plate, the flexible separation film and the building platform are moved one relative to the other and admit first relative positions corresponding to building positions of a layer, in which the transparent plate is applied against the flexible separation film which is in a tense state; and controlling the additive manufacturing system (1) so that transparent plate, the flexible separation film and the building platform are moved one relative to the other and admit second relative positions corresponding to layering positions of a layer, in which the transparent plate is moved relative to the frame and is remote to the flexible separation film which is at least partially in a loose state, wherein the transparent plate, the frame, and the building platform are movable relative to one another and to the tank between the respective first relative position and the respective second relative position.

13. Method according to claim 12, wherein it comprises the steps of moving one relative to the others at least two of the building platform (20), the transparent plate (21) and the frame (30) to which is mechanically connected by ends (31) of the flexible separation film (22), dependently or independently; and in particular: raising up or down the building platform (20) towards or remote to a bottom (17) of the tank (10); and/or raising up or down the transparent plate (21) towards or remote to the bottom (17) of the tank (10) and thus towards or remote to the building platform (20); and/or raising up or down the frame (30) to which the flexible separation film (22) is mechanically connected, towards or remote to the bottom (17) of the tank (10) in order to locate at least a part of the flexible separation film (22) in a position relative to both building platform (20) and transparent plate (21); and/or to raising up or down the tank (10) relative to at least one of the building platform (20), transparent plate (21) and frame (30) to which the flexible separation film (22) is mechanically connected.

14. Method according to claim 12, wherein, in building positions, the transparent plate (21) is located close to the building platform (20) and acts on a middle portion (36) of the flexible separation film (22) so that the middle portion (36) of the flexible separation film (22) is tensed, but not stretched, and a predetermined thickness (60) of the predetermined material (11) remains between the middle portion (36) of the flexible separation film (22) and an uppermost layer (3) on the building platform (20), the flexible separation film (22) comprises other portions (35) which are interposed between the middle portion (36) and the ends (31) of flexible separation film (22), which are remote to the layer (3) and located between the frame (30) to which the flexible separation film (22) is mechanically connected by the ends (31) and an outline of the layer (3), the other portions (35) of the flexible separation films (22) are at least partially tensed thanks to the action of the transparent plate (21) which is located at a distance of the frame (30).

15. Method according to claim 13, wherein, in at least layering positions, the transparent plate (21) is moved remote to the building platform (20) and the flexible separation film (22) and is located close to the frame (30) to which the flexible separation film (22) is mechanically connected by the ends (31), and a temporarily space (50) is formed between the transparent plate (21) and the flexible separation film (22), the flexible separation film (22) comprises a middle portion (36) and other portions (35) extending from the middle portion (36) to the ends (31) of the flexible separation film (22), the middle portion (36) being tensed due to an adhesive contact with a cured uppermost layer (3), and the other portions (35) being loose, so that the other portions (35) are at least partially free of movement between the tensed portion (36) and the respective ends (31); and in at least other layering positions, the flexible separation film (22) is fully peeled away from and located remote to a cured uppermost layer on the building platform (20), and is fully loose and free of movement between the ends (31).

\* \* \* \* \*